United States Patent
Kasher et al.

(10) Patent No.: US 10,447,351 B2
(45) Date of Patent: Oct. 15, 2019

(54) PARTIAL MULTI-ANTENNA SECTOR LEVEL SWEEP

(71) Applicant: QUALCOMM Incorporated, San Diego, CA (US)

(72) Inventors: Assaf Yaakov Kasher, Haifa (IL); Alecsander Petru Eitan, Haifa (IL); Solomon Trainin, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/906,362

(22) Filed: Feb. 27, 2018

(65) Prior Publication Data

US 2019/0036572 A1    Jan. 31, 2019

Related U.S. Application Data

(60) Provisional application No. 62/465,151, filed on Feb. 28, 2017.

(51) Int. Cl.
| | |
|---|---|
| H04B 7/0408 | (2017.01) |
| H04B 7/0456 | (2017.01) |
| H04B 7/06 | (2006.01) |
| H04B 7/0417 | (2017.01) |
| H04W 16/28 | (2009.01) |

(52) U.S. Cl.
CPC ......... *H04B 7/0408* (2013.01); *H04B 7/0417* (2013.01); *H04B 7/0482* (2013.01); *H04B 7/0617* (2013.01); *H04B 7/0695* (2013.01); *H04W 16/28* (2013.01); *H04B 7/063* (2013.01); *H04B 7/0632* (2013.01)

(58) Field of Classification Search
CPC .. H04B 7/0408; H04B 7/0417; H04B 7/0632; H04B 7/063; H04B 7/0617; H04W 16/28
USPC .......................................................... 375/267
See application file for complete search history.

(56) References Cited

U.S. PATENT DOCUMENTS 8,509,130 B2 *  8/2013  Liu ...................... H04B 7/0695
                                                 342/367
10,141,994 B2 * 11/2018  Sanderovich ........ H04B 7/0491
(Continued)

OTHER PUBLICATIONS

IEEE P802.11ad, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE Computer Society, Dec. 28, 2012, pp. 628.
(Continued)

*Primary Examiner* — Juan A Torres
(74) *Attorney, Agent, or Firm* — Steven R. Thiel; Patterson & Sheridan LLP

(57) ABSTRACT

Certain aspects of the present disclosure provide methods and apparatus for enhancing a beamforming training procedure. For example, according to certain aspects, devices may exchange information regarding the number of beamforming transmit sectors each device plans to use for both partial and full sector sweeps, as well as the number of receive antennas. The devices may also exchange timing information used to synchronize when the devices start to perform the partial and full sector sweeps, after detecting a lost link.

21 Claims, 13 Drawing Sheets

(56) References Cited

U.S. PATENT DOCUMENTS

| | | |
|---|---|---|
| 2010/0265925 A1 | 10/2010 | Liu et al. |
| 2013/0231059 A1 | 9/2013 | Prasad et al. |
| 2016/0119043 A1* | 4/2016 | Rajagopal ............... H04B 7/063 370/329 |
| 2017/0079031 A1* | 3/2017 | Maltsev, Jr. .......... H04B 7/0491 |
| 2017/0111099 A1* | 4/2017 | Jo ........................ H04B 7/0684 |
| 2017/0126302 A1* | 5/2017 | Sanderovich ......... H04W 28/06 |
| 2018/0191415 A1* | 7/2018 | Aryafar ................ H04B 7/0617 |

OTHER PUBLICATIONS

International Search Report and Written Opinion—PCT/US2018/020186—ISA/EPO—dated May 30, 2018.

Nitsche T., et al., "IEEE 802.11ad: Directional 60 GHz communication for multi-Gigabit-per-second Wi-Fi [Invited Paper]", IEEE Communications Magazine, IEEE Service Center, Piscataway, us. vol. 52. No. 12, Dec. 1, 2014 (Dec. 1, 2014), XP011567636, pp. 132-141.

Submission Page, et al., "May 2017 doc.: IEEE 802.11-yy/xxxxr0 Partial Multi-Antenna SLS Author (S): Name Affiliation Address Phone email Assaf Kasher Qualcomm", May 24, 2017, XP055477077, 4 pages, Retrieved from the Internet: URL: https://mentor.ieee.org/802.11/dcn/17/ 11-17-0431-00-00ay-partial-multi-antenna-sls.docx [retrieved on May 22, 2018].

\* cited by examiner

PARTIAL MULTI-ANTENNA SECTOR LEVEL SWEEP

CLAIM OF PRIORITY UNDER 35 U.S.C. § 119

The present application for patent claims benefit of U.S. Provisional Patent Application Ser. No. 62/465,151, filed Feb. 28, 2017, assigned to the assignee hereof and hereby expressly incorporated by reference herein.

BACKGROUND

Field of the Disclosure

Certain aspects of the present disclosure generally relate to wireless communications and, more particularly, to enhancing a beamforming training procedure.

Description of Related Art

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

The procedure to adapt the transmit and receive antennas, referred to as beamform training, may be performed initially to establish a link between devices and may also be performed periodically to maintain a quality link using the best transmit and receive beams.

However, beamforming training represents a significant amount of overhead, as the training time reduces data throughput. The amount of training time increases as the number of transmit and receive antennas increase, resulting in more beams to evaluate during training.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate at least one first frame indicating a first number of beamforming transmit sectors for the apparatus to use for a first type of sector sweep procedure and a second number of beamforming transmit sectors for the apparatus to use for a second type of sector sweep procedure, and a first interface configured to output the first frame for transmission to a wireless node. The processing system is further configured to participate in the first type of sector sweep procedure with the wireless node, according to the first number of transmit sectors, after detecting a loss of a communication link established with the wireless node.

Certain aspects of the present disclosure provide an apparatus for wireless communications. The apparatus generally includes a first interface configured to obtain, from a wireless node, at least one first frame indicating a first number of beamforming transmit sectors for the wireless node to use for a first type of sector sweep procedure and a second number of beamforming transmit sectors for the wireless node to use for a second type of sector sweep procedure and a processing system configured to participate in the first type of sector sweep procedure with the wireless node, according to the first number of transmit sectors, after detecting a loss of a communication link with the wireless node.

Aspects of the present disclosure generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
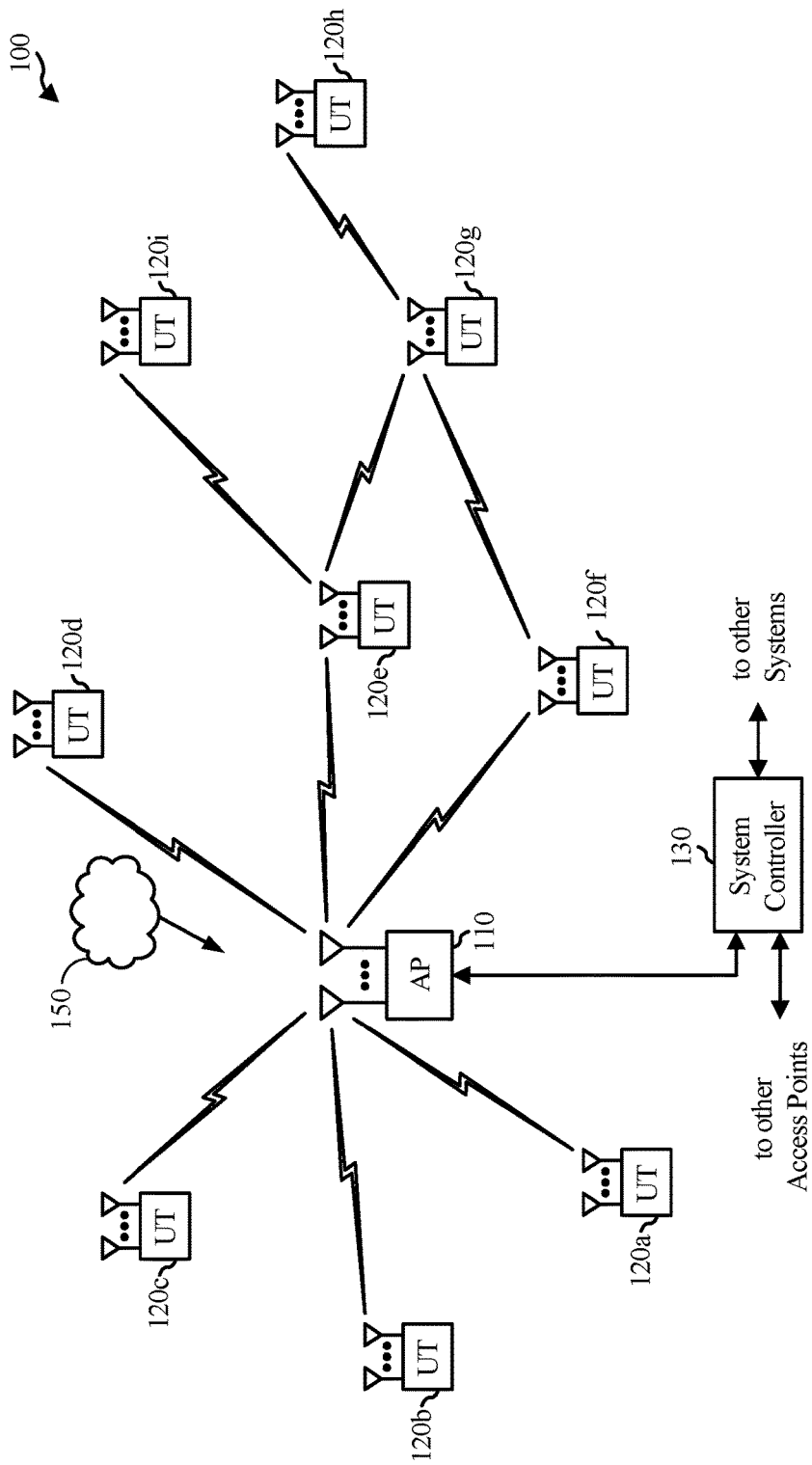
FIG. 1 is a diagram of an example wireless communications network, in accordance with certain aspects of the present disclosure.

Certain aspects of the present disclosure provide methods and apparatus for enhancing a beamforming training procedure for multi-antenna array devices. By exchanging information regarding a number of transmit sectors for both partial and full sector sweeps, an initiator and responder effectively define two levels of sector sweep length for the link lost state. By also exchanging information regarding times in which both devices begin partial and full sector sweeps, the devices may stay in synch, avoiding unnecessary repetitions of sector sweeps for certain antennas.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a wireless station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it may be desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
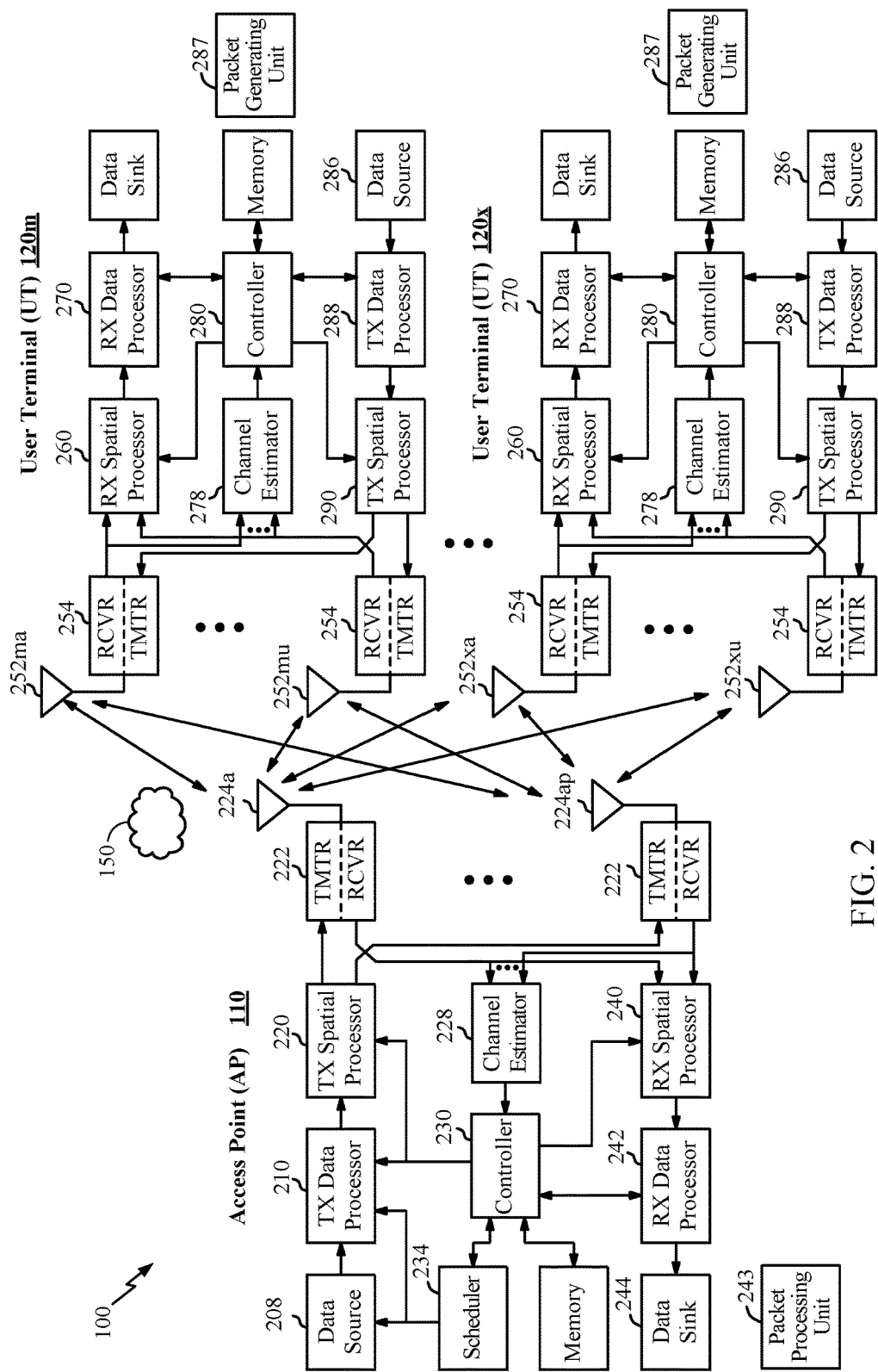
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 (e.g., 120m, 120x) selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222.

While transceivers 222 with integrated transmitter and receiver units are shown in this example, in some cases, separate receiver units and transmitter units may be provided.

Further, in some cases, a single transceiver (or separate receiver and/or transmitter units) may be selectively connected to different antenna arrays through a switch. As will be described in greater detail below, aspects of the present disclosure provide techniques that may improve performance of beamforming training for devices that have different antenna arrays.

Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150, with a preamble format as described herein (e.g., in accordance with one of the example formats shown in FIGS. 3A-3B), to the access point 110. Each packet 150 may be transmitted on a set of one or more spatial streams (e.g., up to 4). For certain aspects, the preamble portion of the packet 150 may include tone-interleaved LTFs, subband-based LTFs, or hybrid LTFs (e.g., in accordance with one of the example implementations).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., ith which amendment to the IEEE 802.11 standard the received packet complies). For example, the packet processing unit 243 may process a packet 150 based on the IEEE 802.11ay standard, but may interpret a legacy packet (e.g., a packet complying with IEEE 802.ad) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
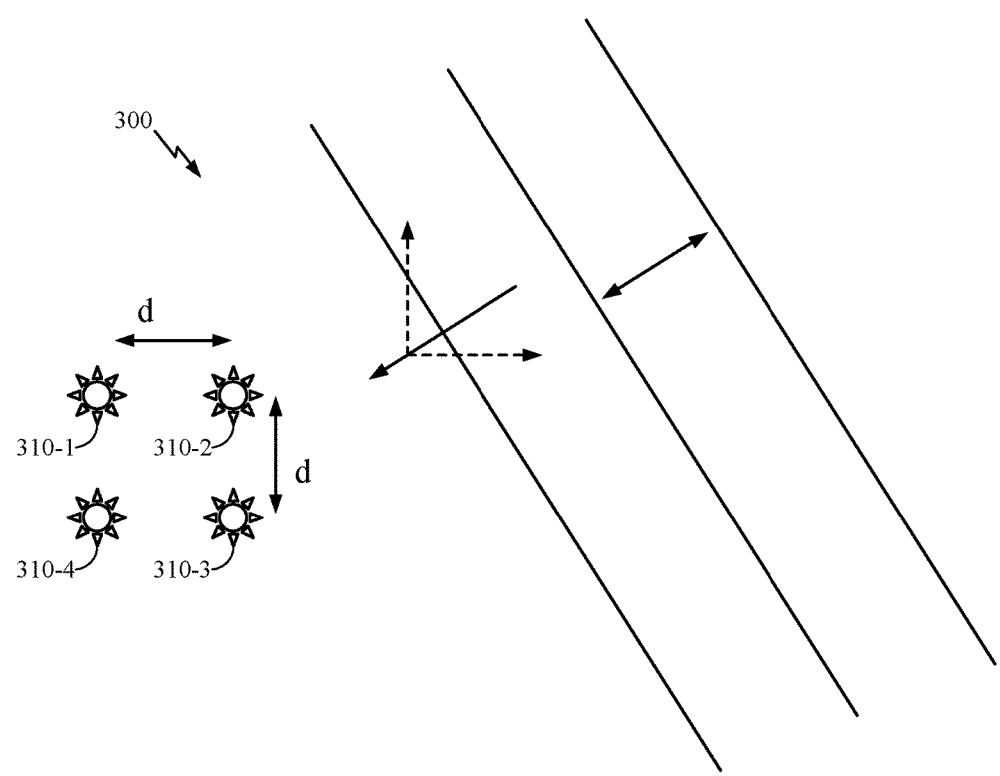
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high frequency (e.g., mmWave) communication systems like 60 GHz (e.g., 802.11ad and 802.11ay), communication may rely on beamforming (BF), using phased arrays on both sides for achieving good link quality. As described above, beamforming (BF) generally refers to a mechanism used by a pair of STAs to adjust transmit and/or receive antenna settings to achieve a desired link budget for subsequent communication.

Figure 4:
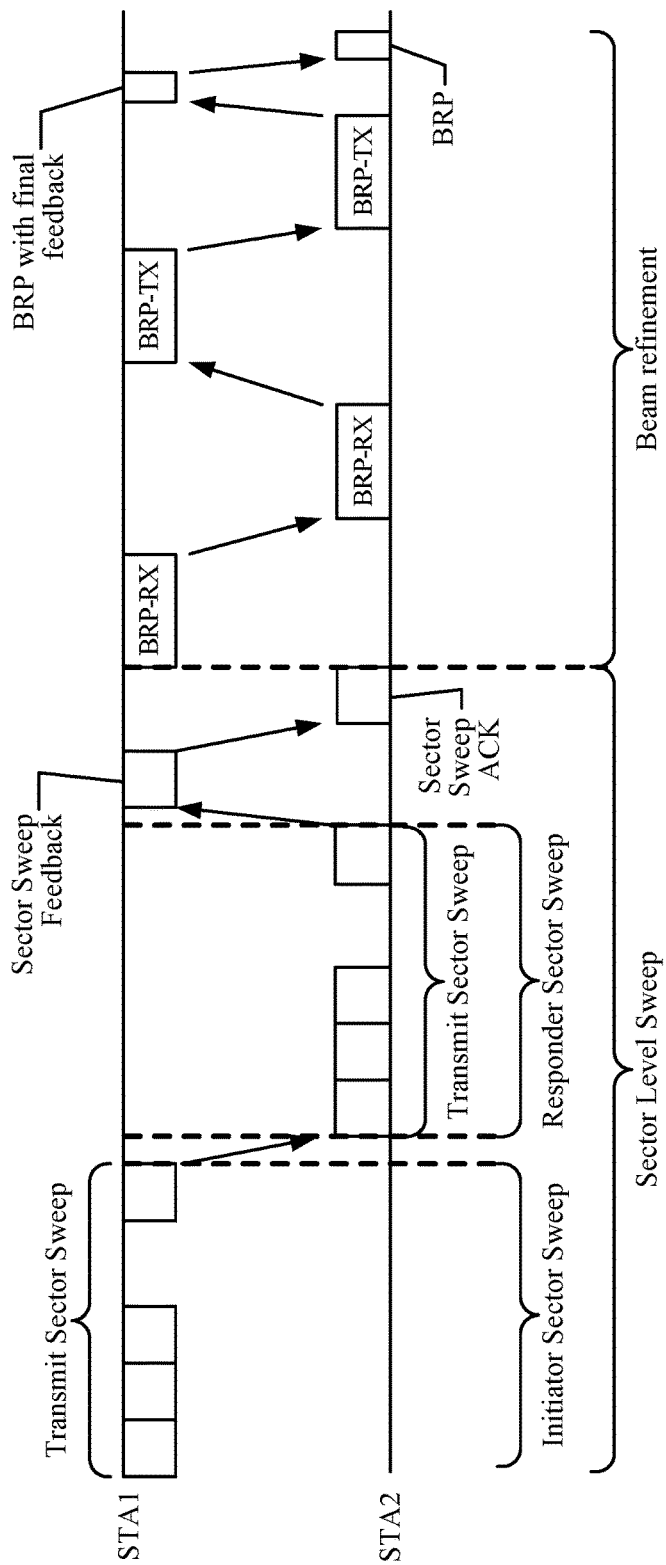
FIG. 4 illustrates an example beamforming training procedure.

As illustrated in FIG. 4, BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission may be sent using a different sector (covering a directional beam of a certain width) identified in the frame and each transmission may provide the necessary signaling to allow each STA to determine appropriate antenna system settings for both transmission and reception.

In cases where the STAs have a large number of antenna elements, the sectors used are relatively narrow, causing the SLS (Sector Level Sweep) process to be long. The higher the directivity, the more sectors needed and, therefore, duration of the SLS is longer. As an example, a STA with an array of 100 antenna elements may use 100 sectors. The lengthy SLS procedure may interrupt data transmissions, which may have an impact on throughput, power consumption and induces a gap in the transport flow.

Various techniques may be used to try and reduce SLS duration. For example, short SSW (SSSW) messages may be used instead of conventional SSW messages, which may save some time (e.g., about 36%). In some cases, throughput may be improved by utilizing the fact that in such APs the transmitter may transmit via several RF chains. This technique may facilitate transmission in parallel on several single channels. This technique may also shorten the scan by a factor number of frequencies (2, 3, or 4). However, this approach may involve the receiver supporting scans of the multiple frequencies, and the approach may not be backward compatible with, for example, 802.11ad devices. This approach may further involve the stations being fully aware of this special mode in advance. In some cases, the Tx SLS+Rx SLS or the Tx SLS+Rx BRP may be replaced with a new Tx+Rx BRP where one "very" long BRP message may be used with many TRN units. This method may involve a very long message, but may be able to support multiple STAs in parallel, making it efficient but only in cases with a large number of STAs.

Example Beamforming Training with Partial Multi-Antenna SLS

As noted above, to achieve reasonable ranges in high frequency communications systems (e.g., 60 GHz), devices may have multiple, high gain phased array antennas. Further, to get these high gain antennas to point in the right direction a beamforming training algorithm may be implemented. To train devices with multiple antennas, a transmit sector sweep may be repeated for each transmit antenna array of an initiator and for each receive antenna array of a responder. Such beamforming training algorithms take a significant amount of time, particularly when the arrays are relatively large (e.g., with 256/128 elements). Additionally, uses such as Virtual Reality/Augmented Reality (AR/VR) may involve frequent beamforming training.

In one or more cases, when a link is lost and there is no control PHY connection, the devices may have to resort to a TX SLS procedure based on sector sweep packets. A full sector sweep, across all transmit and receive antennas is an effective approach to restablish the lost link but can take a very long time and therefore may interrupt service for too long for any given application. Therefore, in some cases, a partial sector sweep may be performed using a reduced set of sectors. This set may be based on a set of good TX sectors obtained in a previous sector sweep. For single antenna array devices, a partial sector sweep may be relatively straightforward.

However, a partial sector sweep presents a challenge when one (or both) of the devices has multiple Rx antennas. In the case where a device has multiple antennas, the device may have to switch between its RX antennas as the other device repeats each sector sweep. To be effective, the switching rate has to be related to the number of sectors used by the other device. In other words, the number of sectors has to be known in advance so the device can know when one sweep is over and the device can switch to a different RX antenna. This may not be an issue if the number of sectors is constant, but it may be an issue when it is dynamic. Aspects of the present disclosure may facilitate partial sweeps for multi-antenna devices by providing a flexible mechanism for exchanging information regarding the number of sectors (as well as a number of receive antennas) each device may use in a partial sector sweep.

Another challenge presented when a link is lost between multi-antenna devices is that if the sector sweep (SSW) frames in the partial sector sweep are not received by the other side, the device may need to switch to a full sector sweep. In some cases, both devices may need to switch to the full sector sweep together. Aspects of the present disclosure may provide a timing mechanism that allows an initiator and responder to stay in synch regarding when to start a partial sector sweep after a link failure and when to switch from the partial sector sweep to a full sector sweep.

Figure 5:
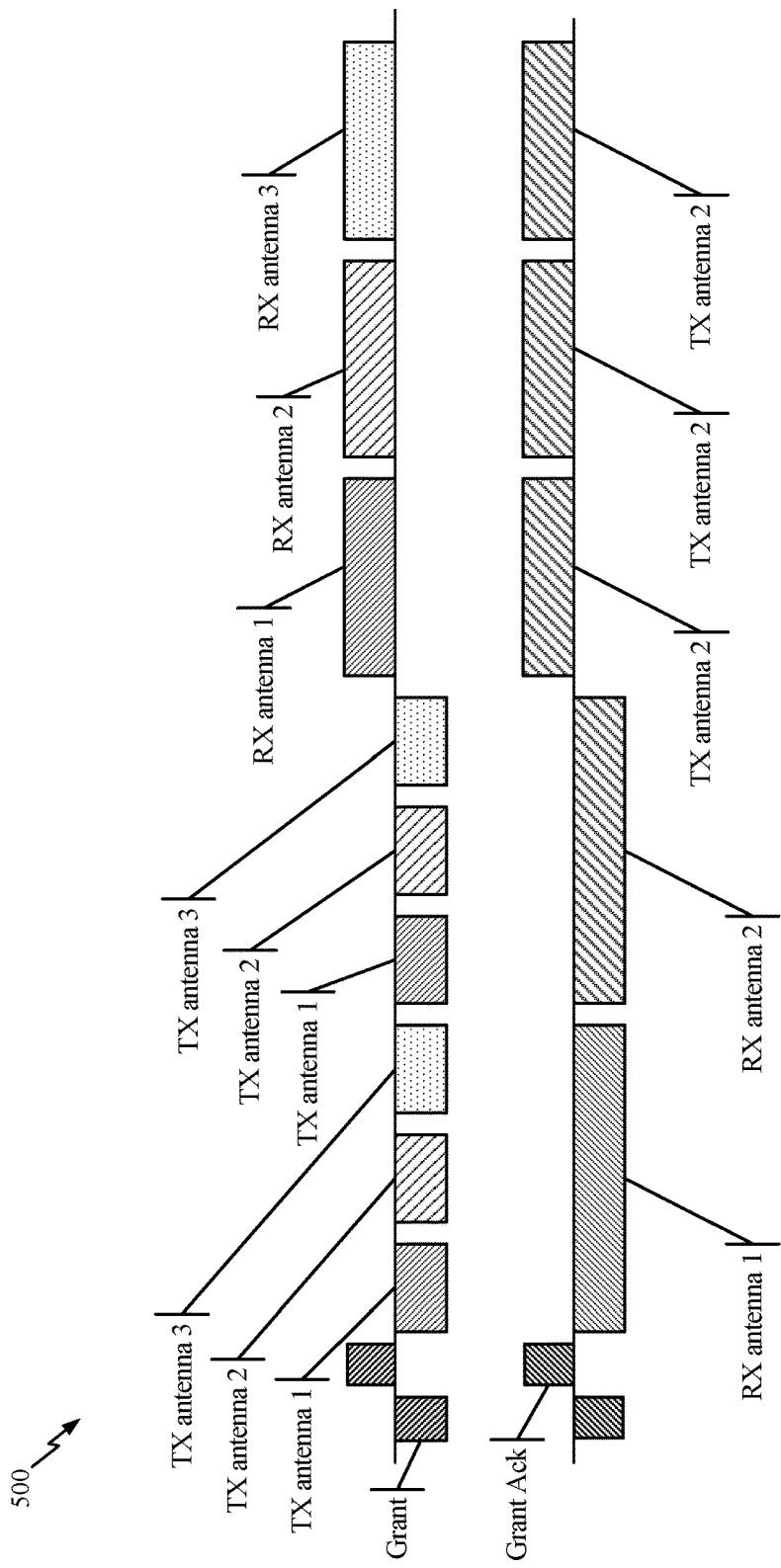
FIG. 5 illustrates an example beamforming training procedure in which an initiator and responder are in synch.

FIG. 5 illustrates an example beamforming training procedure 500 between an initiator (top) and responder (bottom) with multiple antennas. The illustrated example assumes the initiator has 3 TX (and RX) antennas, while the responder has 2 RX (and TX) antennas. As described above, the initiator performs a sector sweep for each of its TX antennas and repeats the same for each of the responder RX antennas. Assuming reciprocity, when training the other direction, the responder may perform a sector sweep transmitting only from the antenna that had the best reception during the initiator sector sweep, but repeats this sweep for all (3) of the initiators Rx antennas.

Figure 6:
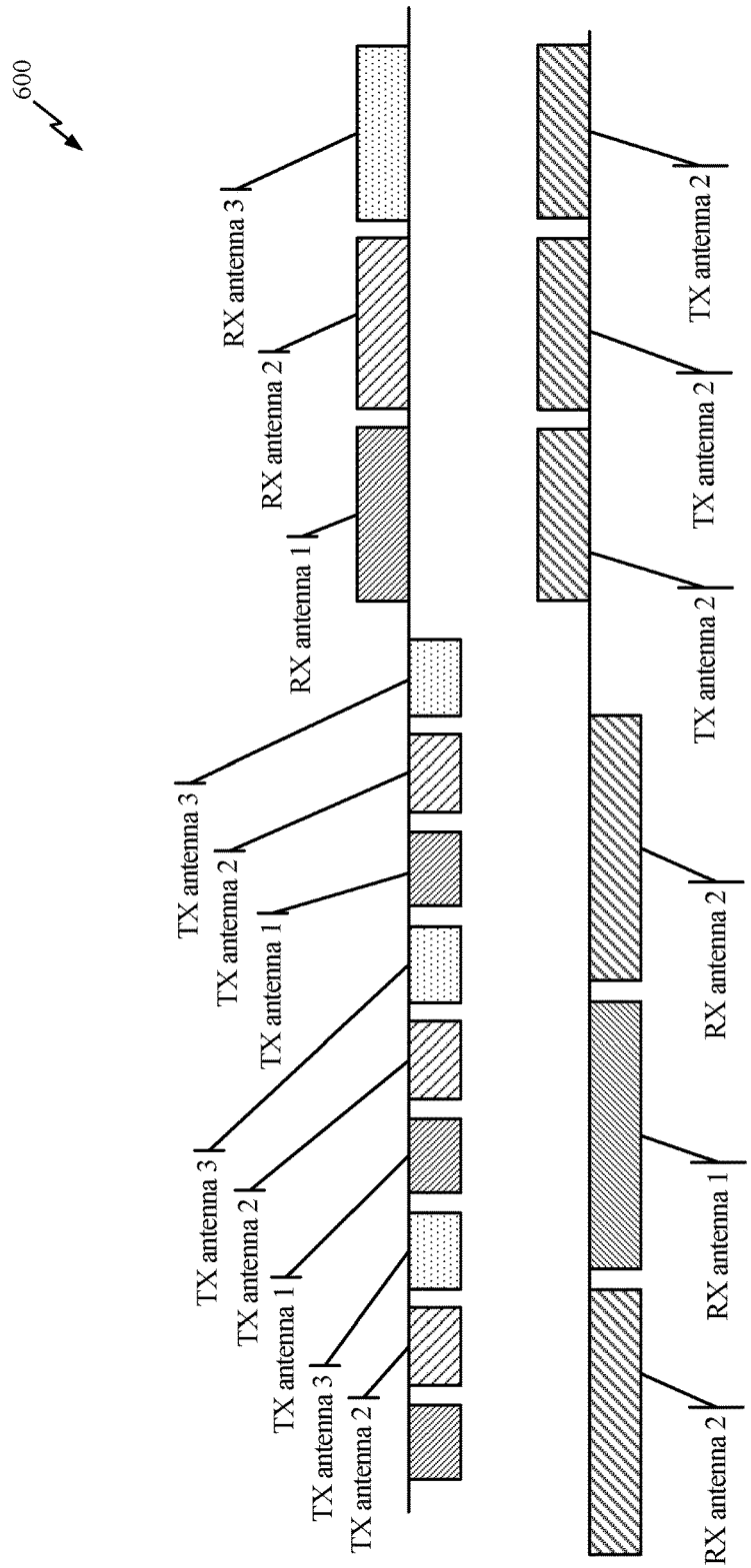
FIG. 6 illustrates an example beamforming training procedure in which an initiator and responder are out of synch.

In FIG. 5, the initiator and responder are in synch, meaning the receiving devices are able to switch their RX antennas at the right time (after each TX sector sweep is complete). FIG. 6, on the other hand, illustrates an example beamforming training procedure when the devices are not synchronized. In this example, the responder may not have received the SSW frames in the first initiator sector sweep (and therefore, does not acknowledge that sweep). As a result, the initiator has to repeat that sector sweep, which increases the latency of the beamforming training.

As noted above, however, aspects of the present disclosure may help an initiator and responder to stay in synch regarding when to start a partial sector sweep after a link failure and when to switch from the partial sector sweep to a full sector sweep. Aspects of the present disclosure also provide a mechanism that allows both devices to agree on a number of antennas and the total length of the partial and full sector sweeps.

Figure 7:
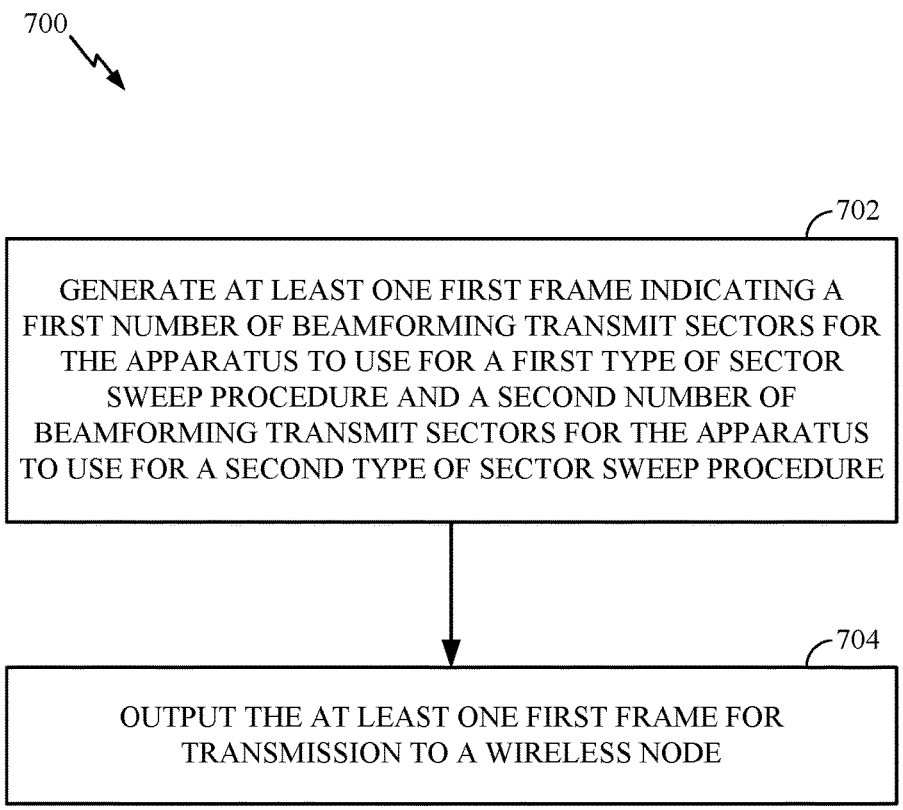
FIG. 7 illustrates example operations for performing beamforming training by an initiator, in accordance with certain aspects of the present disclosure.

FIG. 7 illustrates example operations 700 for performing beamforming training, in accordance with certain aspects of the present disclosure. Operations 700 may be performed by an initiator or a responder device.

Operations 700 begin, at 702, by generating at least one first frame indicating a first number of beamforming transmit sectors for the apparatus to use for a first type of sector sweep procedure (e.g., a partial sector sweep) and a second number of beamforming transmit sectors for the apparatus to use for a second type of sector sweep procedure (e.g., a full sector sweep). At 704 the device outputs the first frame for transmission to a wireless node. In some cases, the device may detect a loss of a communication link established with the wireless node (e.g., based on expiration of a beamforming maintenance timer that is reset with successful transmissions) and, after the detection, the device may participate in the first type of sector sweep procedure with the wireless node.

Figure 7A:
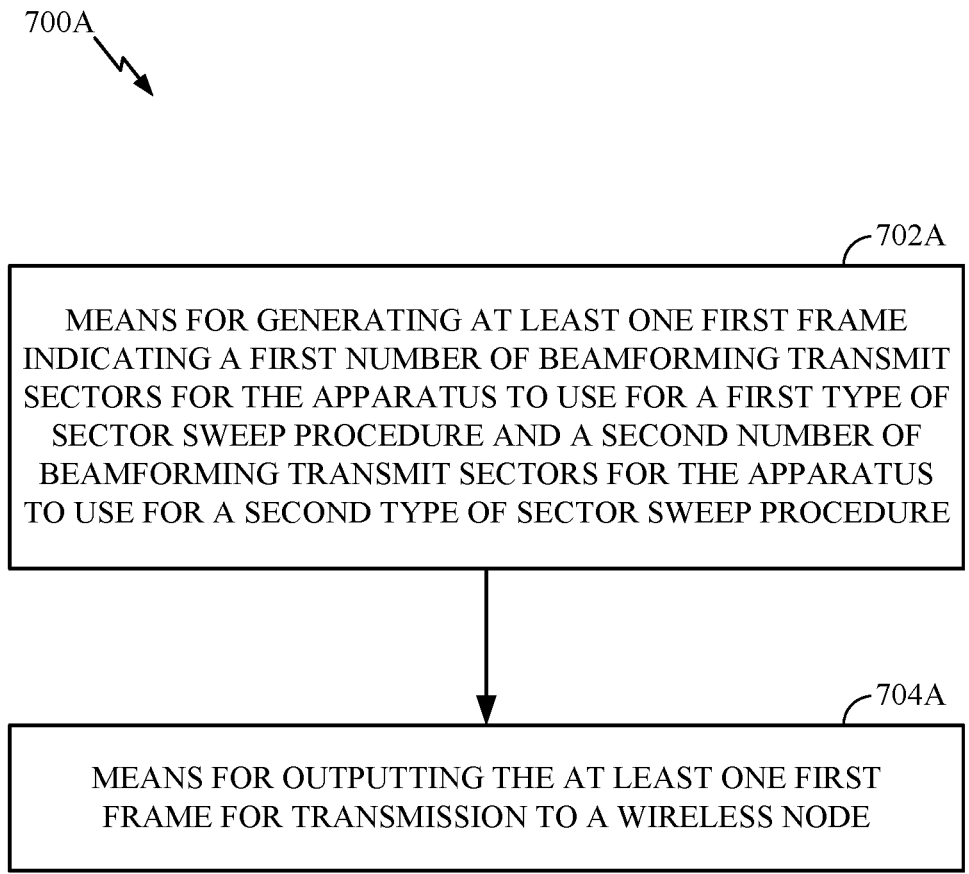
FIG. 7A illustrates example components capable of performing operations of FIG. 7.

FIG. 7A illustrates example components capable of performing operations of FIG. 7. For example, 702A illustrates means for generating at least one first frame indicating a first number of beamforming transmit sectors for the apparatus to use for a first type of sector sweep procedure and a second number of beamforming transmit sectors for the apparatus to use for a second type of sector sweep procedure. Additionally, 704A illustrates means for outputting the first frame for transmission to a wireless node.

Figure 8:
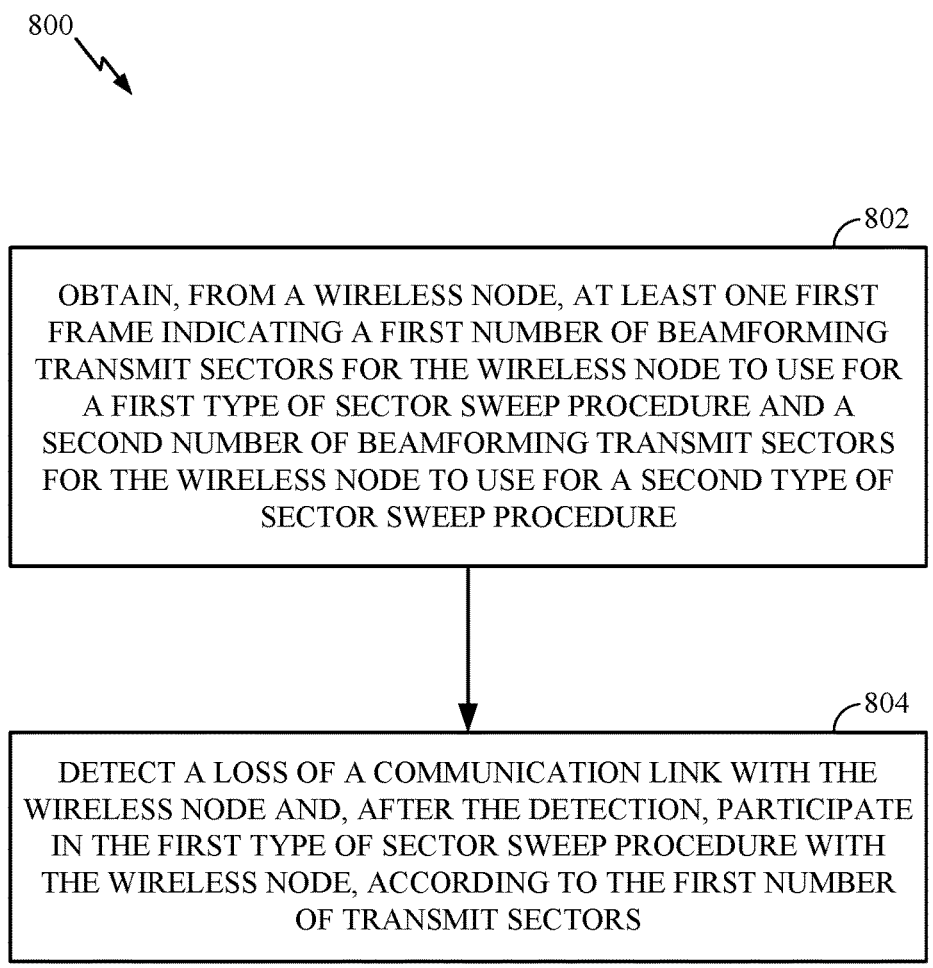
FIG. 8 illustrates example operations for performing beamforming training by a responder, in accordance with certain aspects of the present disclosure.

FIG. 8 illustrates example operations 800 for performing beamforming training, in accordance with certain aspects of the present disclosure. Operations 800 may be performed by an apparatus (e.g., a responder or an initiator device) performing beamforming training with a wireless node performing operations 700 described above.

Operations 800 begin, at 802, by obtaining, from a wireless node, at least one first frame indicating a first number of beamforming transmit sectors for the wireless node to use for a first type of sector sweep procedure and a second number of beamforming transmit sectors for the wireless node to use for a second type of sector sweep procedure. At 804, the apparatus participates in the first type of sector sweep procedure with the wireless node, according to the first number of transmit sectors, after detecting a loss of a communication link with the wireless node.

Figure 8A:
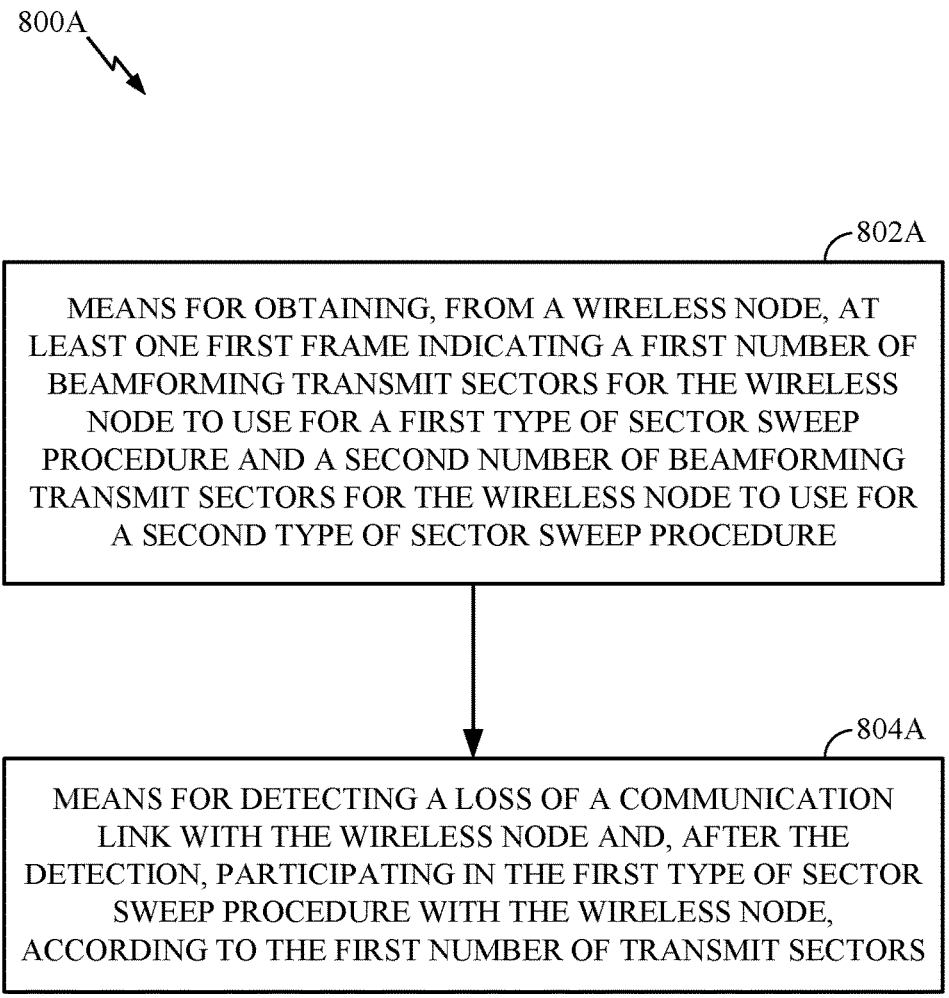
FIG. 8A illustrates example components capable of performing operations of FIG. 8.

FIG. 8A illustrates example components capable of performing operations of FIG. 8. For example, 802A illustrates means for obtaining, from a wireless node, at least one first frame indicating a first number of beamforming transmit sectors for the wireless node to use for a first type of sector sweep procedure and a second number of beamforming transmit sectors for the wireless node to use for a second type of sector sweep procedure. Additionally, 804A illustrates means for detecting a loss of communication link with the wireless node and, after the detection, participating in the first type of sector sweep procedure with the wireless node, according to the first number of transmit sectors.

In accordance with one or more aspects of the present disclosure, a responder may send at least a second frame indicating a third number of beamforming transmit sectors for the wireless node to use for the first type of sector sweep procedure and a fourth number of beamforming transmit sectors for the wireless node to use for the second type of sector sweep procedure, and an initiator may participate in the first type of sector sweep procedure according to the first number of transmit sectors and the third number of transmit sectors after detecting a loss of a communication link with the wireless node.

In some cases, the first type of sector sweep procedure may be a partial sector sweep procedure, for example, using a subset of beamforming transmit sectors used to perform the second sector sweep procedure. The first frame may also include an indication of a first time or a second time, after detecting a loss of a communication link, to at least begin to participate in the partial sector sweep procedure or the second sector sweet procedure, respectively. Operations may also be provided for participating in the second type of sector sweep procedure, according to the second number of transmit sectors if the communication link is not re-established by performing the partial sector sweep procedure before the second time.

In some cases, the first frame may also indicate a number of receive antennas for the apparatus to use for both the first and second types of sector sweep procedures. In some cases, the first frame also indicates at least one of a request for the apparatus to change from an initiator role to a responder role for the first sector sweep procedure or from a responder role to an initiator role for the first sector sweep procedure, or acceptance of a request from the wireless node to change from an initiator role to a responder role for the first sector sweep procedure or from a responder role to an initiator role for the first sector sweep procedure.

Figure 9:
FIG. 9 illustrates an example partial sector sweep information element (IE) in accordance with certain aspects of the present disclosure.

In some cases, the information regarding the number of beamforming transmit sectors for the partial and full sector sweeps may be provided in an information element (IE). FIG. 9 illustrates an example partial sector sweep IE 900 in accordance with certain aspects of the present disclosure. While shown in a single IE, in some cases, the information described below may be included in separate IEs, or otherwise conveyed separately.

As shown, IE 900 may include a number of sectors for a partial sector sweep and a total number of sectors for a full sector sweep. In some cases, the IE may also include the number of Rx antennas.

To help devices synchronize partial and/or full sector sweeps after losing a link, IE 900 may also include timing information, such as a time to start partial BF after detecting a lost link (e.g., assuming a link is lost at T0, for example, with expiration of a BF maintenance timer), as well as a time to switch to full sector sweep after T0.

In some cases, the IE may also include a request for a device to switch roles (e.g., from a responder to initiator) or agreement to allow such a request. This may be helpful if it is advantageous for one device to be an initiator, for example, if that device is plugged into power and is able to perform more transmissions. As another example, in some cases the overall beamforming training time may be reduced if one device is an initiator (e.g., based on the transmit and receive antenna configurations and/or agreed upon number of transmit sectors).

Figure 10:
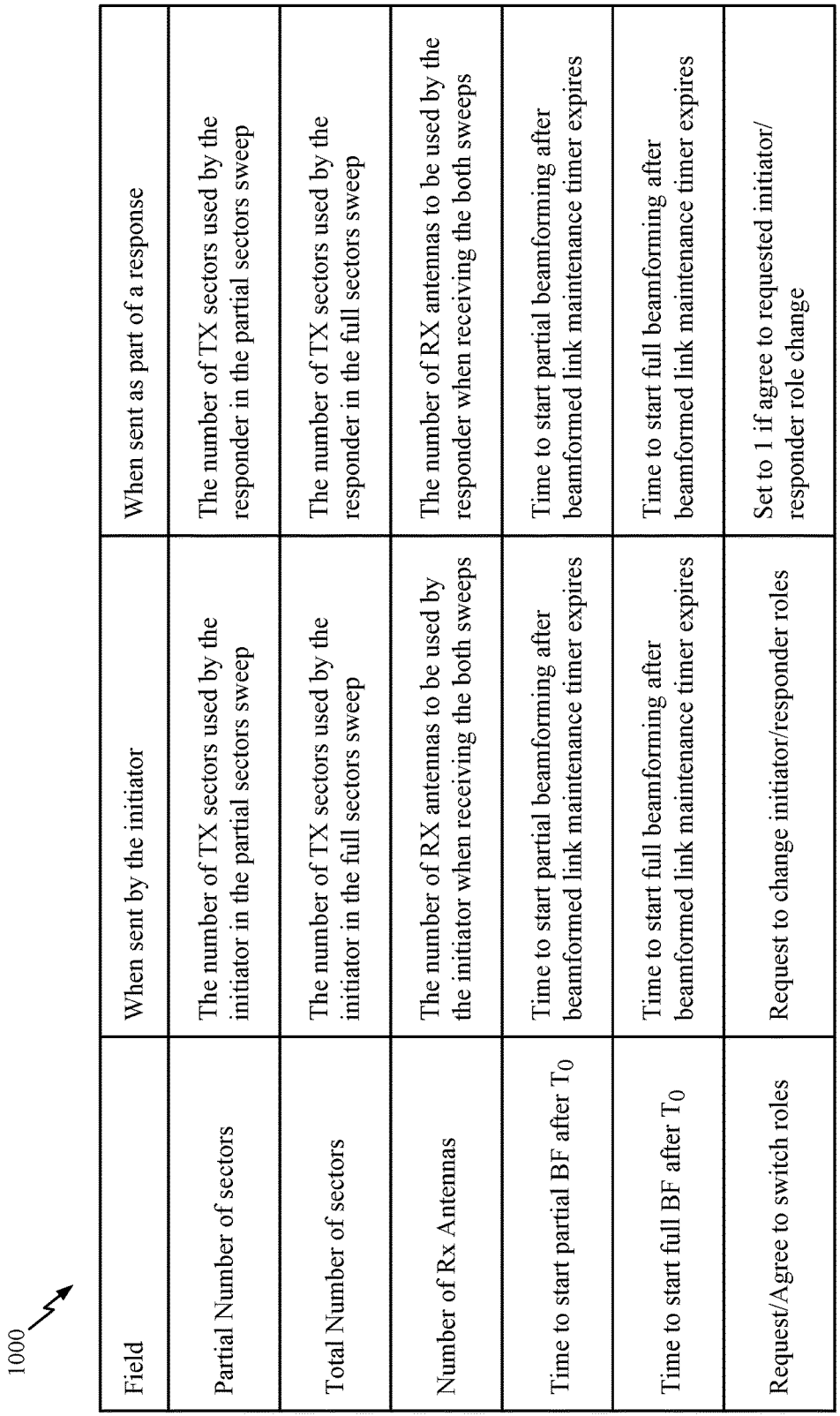
FIG. 10 illustrates a table that defines the meaning of each field of a partial sector sweep information element in accordance with certain aspects of the present disclosure.

FIG. 10 illustrates a table 1000 that defines the meaning of each field in the IE, depending on when the partial sector sweep IE is sent by the initiator or when sent as part of a response. In one or more cases, the partial number of sectors, when sent by the initiator, represents the number of TX sectors used by the initiator in the initiator partial sectors sweep. Alternatively, when sent by a responder, the partial number of sectors may represent the number of TX sectors used by the responder in the responder partial sectors sweep.

The IE may be exchanged in any management action frame. In some cases, The IE may be included in BRP frames. In one or more cases, the IE may be sent by either the initiator of the last beamforming training or the responder of the last beamforming training. This timing makes sense, because after such training the number of good sectors (that might form the basis of a partial sector sweep) may be known. In either case, after receiving the IE, a device may respond by sending its own IE.

Figure 11:
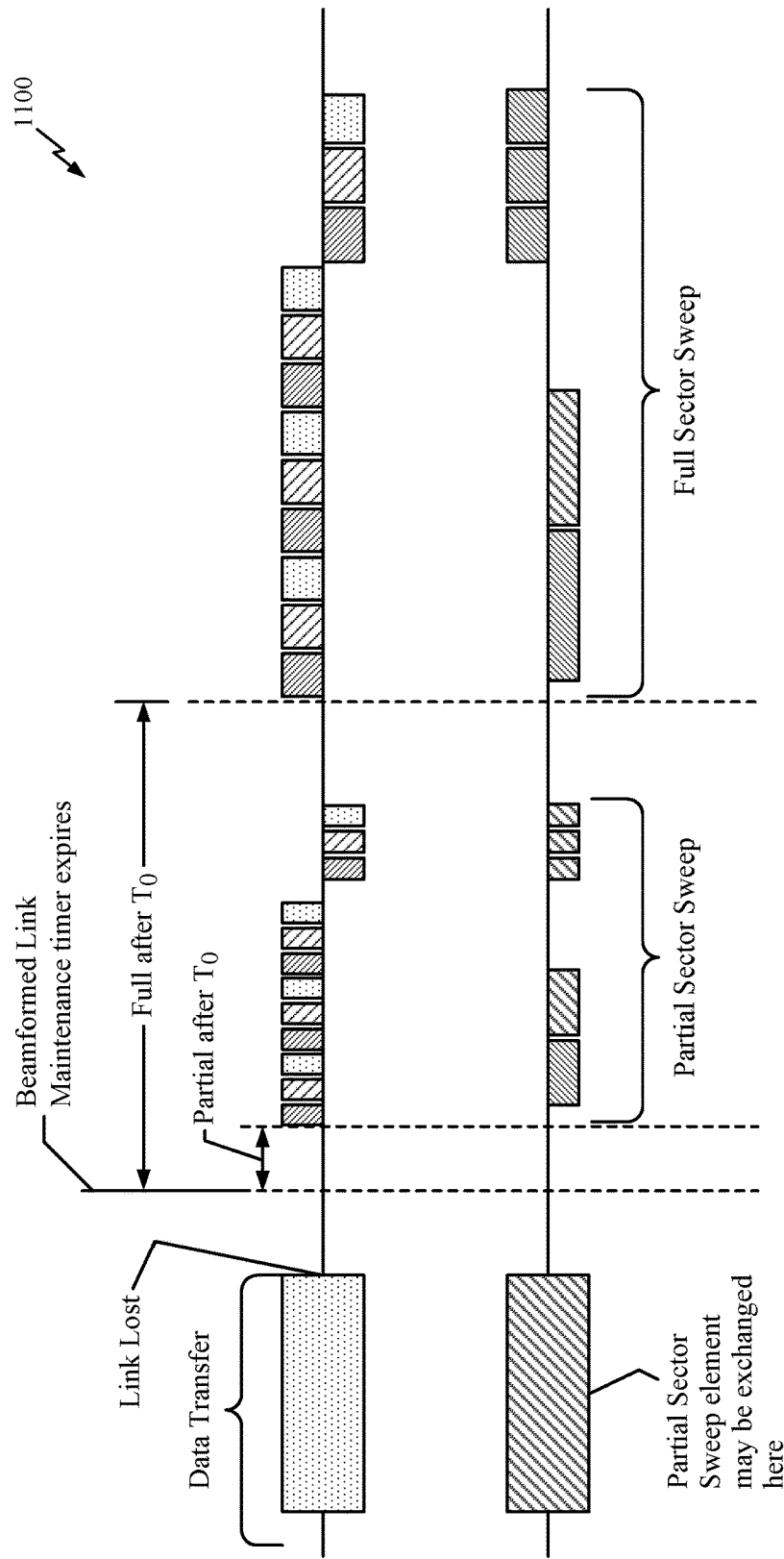
FIG. 11 illustrates an example beamforming training procedure, in accordance with certain aspects of the present disclosure.

FIG. 11 illustrates an example beamforming training procedure 1100 in accordance with certain aspects of the present disclosure, utilizing the timing mechanism described above to initiate partial and/or full sector sweeps after losing a link.

The time line of FIG. 11 assumes that previously (e.g., during data transfer or in some BF process) the partial sector sweep information element is exchanged. At some point, the link is lost (e.g., due to a blocker, or due to turning/re-orienting of one of the devices). After the link is lost, a beamformed link maintenance timer may expire (corresponding to reference time T0 referenced in table 9—although the timing of expiration of this timer may not be perfectly in synch between the two devices). Now the timing information exchanged may be used to synchronize both devices to try and restore the lost link.

In some cases, after the "Time to start partial BF after T0", both devices may begin to participate in the partial BF process using their stated/declared number of sectors and Rx antennas. If the partial SLS procedure succeeds, the partial SLS procedure may be followed by another BF process (e.g., beamforming refinement) and then a data transfer.

On the other hand, if the partial SLS procedure fails (possibly several times depending on the corresponding timer values), after the "Time to start Full BF after T0", both devices start the full BF, using the full length sector sweep at both sides.

As described herein, aspects of the present disclosure provide a mechanism for devices to exchange a number of transmit sectors to be used for partial and full sector sweeps, effectively, defining two levels of sector sweep length for the link lost state. By exchanging timing information, the devices may also stay in synch when performing a partial sector sweep and when transitioning from a partial sector sweep to a full sector sweep.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively.

For example, means for outputting or means for transmitting may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for obtaining or means or receiving may comprise a receiver (e.g., the receiver unit 222) and/or an antenna(s) 224 of the access point 110 or the receiver unit 254 and/or antenna(s) 254 of the user terminal 120 illustrated in FIG. 2. Means for participating, means for accepting, means for indicating, means for performing, means for detecting, means for using, means for determining, or means for generating may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, an interface to output a frame for transmission and an interface to obtain a frame may be integrated in a single interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate at least one first frame indicating a first number of beamforming transmit sectors for the apparatus to use for a first type of sector sweep procedure and a second number of beamforming transmit sectors for the apparatus to use for a second type of sector sweep procedure; and
   a first interface configured to output the at least one first frame for transmission to a wireless node.

2. The apparatus of claim 1, wherein the at least one first frame comprises a beamforming refinement phase (BRP) frame.

3. The apparatus of claim 1, further comprising:
   a second interface configured to obtain, from the wireless node, at least a second frame indicating a third number of beamforming transmit sectors for the wireless node to use for the first type of sector sweep procedure and a fourth number of beamforming transmit sectors for the wireless node to use for the second type of sector sweep procedure; and
   the processing system is further configured to detect a loss of a communication link with the wireless node and, after the detection, participate in the first type of sector sweep procedure according to the first number of transmit sectors and the third number of transmit sectors.

4. The apparatus of claim 1, wherein:
   the second type of sector sweep procedure uses a set of beamforming transmit sectors; and
   the first type of sector sweep procedure comprises a partial sector sweep procedure using only a subset of the set of beamforming transmit sectors used for the second type of sector sweep procedure.

5. The apparatus of claim 1, wherein:
   the at least one first frame also indicates a number of receive antennas for the apparatus to use for both the first type of sector sweep procedure and the second type of sector sweep procedure.

6. The apparatus of claim 1, wherein:
   the at least one first frame also indicates a request for the apparatus to change from an initiator role to a responder role for the first type of sector sweep procedure or from a responder role to an initiator role for the first type of sector sweep procedure;
   the apparatus further comprises a second interface configured to obtain, from the wireless node, at least a second frame indicating a response to the request; and
   the processing system is further configured to participate in the first type of sector sweep procedure in the initiator role or the responder role according to the response.

7. The apparatus of claim 1, wherein:
   the apparatus further comprises a second interface configured to obtain, from the wireless node, at least a second frame indicating a request from the wireless node for the apparatus to change from an initiator role to a responder role for the first type of sector sweep procedure or from a responder role to an initiator role for the first type of sector sweep procedure;
   the at least one first frame also indicates a response to the request; and
   the processing system is further configured to participate in the first type of sector sweep procedure in the initiator role or the responder role according to the response.

8. The apparatus of claim 4, wherein:
   the processing system is further configured to detect a loss of a communication link with the wireless node; and
   the at least one first frame also includes an indication of a time, after the detection, to at least begin to participate in the partial sector sweep procedure with the wireless node.

9. The apparatus of claim 4, wherein:
   the processing system is further configured to detect a loss of a communication link with the wireless node;
   the at least one first frame also includes an indication of a time, the detection, to at least begin to participate in the second type of sector sweep procedure; and
   the processing system is further configured to participate in the second type of sector sweep procedure with the wireless node, according to the second number of transmit sectors if the communication link is not re-established by performing the partial sector sweep procedure before the time.

10. An apparatus for wireless communications, comprising:
    a first interface configured to obtain, from a wireless node, at least one first frame indicating a first number of beamforming transmit sectors for the wireless node to use for a first type of sector sweep procedure and a second number of beamforming transmit sectors for the wireless node to use for a second type of sector sweep procedure; and
    a processing system configured to detect a loss of a communication link with the wireless node and, after the detection, participate in the first type of sector sweep procedure with the wireless node, according to the first number of transmit sectors.

11. The apparatus of claim 10, wherein the processing system is further configured to participate in the second type of sector sweep procedure with the wireless node, according to the second number of transmit sectors if the communication link is not re-established by performing the first type of sector sweep.

12. The apparatus of claim 10, wherein the at least one first frame comprises a beamforming refinement phase (BRP) frame.

13. The apparatus of claim 10, further comprising a second interface, wherein:
the processing system is further configured to generate at least a second frame indicating a third number of beamforming transmit sectors for the apparatus to use for the first type of sector sweep procedure and a fourth number of beamforming transmit sectors for the apparatus to use for the second type of sector sweep procedure;
the second interface is configured to output the at least a second frame for transmission to the wireless node; and
the processing system is further configured to detect a loss of a communication link with the wireless node and, after the detection, participate in the first type of sector sweep procedure according to the first number of transmit sectors and the third number of transmit sectors.

14. The apparatus of claim 10, wherein:
the second type of sector sweep procedure uses a set of beamforming transmit sectors; and
the first type of sector sweep procedure comprises a partial sector sweep procedure using a subset of the beamforming transmit sectors used for the second type of sector sweep procedure.

15. The apparatus of claim 10, wherein:
the at least one first frame also indicates a number of receive antennas for the wireless node to use for both the first type of sector sweep procedure and the second type of sector sweep procedure.

16. The apparatus of claim 10, further comprising a second interface, wherein:
the at least one first frame also indicates a request for the first wireless node to change from an initiator role to a responder role for the first type of sector sweep procedure or from a responder role to an initiator role for the first type of sector sweep procedure;
the processing system is further configured to generate at least a second frame indicating a response to the request;
the second interface is configured to output the at least a second frame for transmission to the first wireless node; and the processing system is configured to participate in the first type of sector sweep procedure according to the response.

17. The apparatus of claim 10, further comprising a second interface, wherein:
the processing system is further configured to generate at least one second frame indicating a request from the apparatus for the first wireless node to change from an initiator role to a responder role for the first type of sector sweep procedure or from a responder role to an initiator role for the first type of sector sweep procedure;
the second interface is configured to output the at least one second frame for transmission to the first wireless node;
the at least one first frame also indicates a response to the request; and
the processing system is configured to participate in the first type of sector sweep procedure according to the response.

18. The apparatus of claim 10, further comprising at least one antenna via which the at least one first frame is obtained, wherein the apparatus is configured as a wireless station.

19. The apparatus of claim 14, wherein:
the processing system is further configured to detect a loss of a communication link with the wireless node, at a time indicated in the at least one first frame and, after the detection, begin to participate in the partial sector sweep procedure with the wireless node, at a time indicated in the at least one first frame.

20. The apparatus of claim 14, wherein:
the processing system is further configured to detect a loss of a communication link with the wireless node and, after the detection, begin to participate in the second type of sector sweep procedure, at a time indicated in the at least one first frame if the communication link is not re-established by performing the partial sector sweep procedure.

21. A wireless station, comprising:
a processing system configured to generate at least one first frame indicating a first number of beamforming transmit sectors for the wireless station to use for a first type of sector sweep procedure and a second number of beamforming transmit sectors for the wireless station to use for a second type of sector sweep procedure; and
a transmitter configured to transmit the at least one first frame to a wireless node.

* * * * *